United States Patent [19]

Stahlecker et al.

[11] Patent Number: 5,670,002
[45] Date of Patent: Sep. 23, 1997

[54] PROCESS FOR COVERING CUT EDGE OF A CONTAINER OPENING WITH PROTECTIVE LAYER

[75] Inventors: Werner Stahlecker, Stuttgart; Berthold Mueller, Suessen, both of Germany

[73] Assignee: Ruediger Haaga GmbH, Germany

[21] Appl. No.: 418,801

[22] Filed: Apr. 7, 1995

[30] Foreign Application Priority Data

Apr. 7, 1994 [DE] Germany .................. 44 11 925.9

[51] Int. Cl.[6] .................. B32B 31/02; B32B 31/04; B32B 31/16; B32B 31/26

[52] U.S. Cl. .................. 156/216; 156/69; 156/223; 156/252; 156/253; 156/293; 220/269; 220/270; 220/359; 229/125.14; 229/125.15

[58] Field of Search .................. 156/69, 216, 223, 156/293, 252–253, 308.2, 308.4, 309.6; 229/125.14, 125.15; 220/269–270, 359; 53/478, 471, 412, 133.3, 133.2, 329.3

[56] References Cited

U.S. PATENT DOCUMENTS

| | | |
|---|---|---|
| 2,565,753 | 8/1951 | Botwinick .................. 156/216 |
| 4,116,359 | 9/1978 | Josephy . |
| 4,170,314 | 10/1979 | Weirman et al. .................. 220/359 X |
| 4,397,401 | 8/1983 | Ueno et al. . |
| 4,526,287 | 7/1985 | Miyamatsu et al. . |
| 4,595,116 | 6/1986 | Carlsson .................. 220/359 |
| 4,705,197 | 11/1987 | Gordon et al. .................. 220/359 X |
| 5,158,633 | 10/1992 | Rausing .................. 156/69 X |
| 5,452,849 | 9/1995 | Schramer et al. .................. 220/270 X |

FOREIGN PATENT DOCUMENTS

| | | |
|---|---|---|
| 2185547 | 1/1974 | France . |
| 57-175550 | 10/1982 | Japan .................. 156/69 |

*Primary Examiner*—Adrienne C. Johnstone
*Attorney, Agent, or Firm*—Evenson, McKeown, Edwards & Lenahan, P.L.L.C.

[57] ABSTRACT

A container comprises an opening whose cut edge is covered by a protective covering layer. The protective covering layer is formed to have a tube-shaped area in which a plane area is joined to both ends. The tube-shaped area covers the cut edge of the opening. One plane area adheres to the container inner surface, and the other plane area adheres to the container outer surface. The protective covering layer is made from a single foil piece which is applied to the container wall comprising the opening and thereafter shaped into its form. At least one of the plane areas is thus formed and adhered to the container wall.

14 Claims, 8 Drawing Sheets

PROCESS FOR COVERING CUT EDGE OF A CONTAINER OPENING WITH PROTECTIVE LAYER

BACKGROUND AND SUMMARY OF THE INVENTION

The present invention relates to a process for covering a cut edge of an opening of a container with a protective covering layer, including a tube-shaped area covering the cut edge, a plane area adhering to the outer surface of the container and a plane area adhering to the inner surface of the container.

The present invention relates further to a container comprising at least one container wall which has an opening with a cut edge being covered by a protective covering layer which covers at least a part of the inner surface and the outer surface of the container wall.

U.S. Pat. No. 4,397,401 describes a process for covering a cut edge in which a protective covering layer is made from two sheet-like foil pieces. The two foil pieces of foil are applied to the container wall which comprises the opening. One foil piece is laid onto the outer surface, and the other foil piece is laid onto the inner surface of the container wall, whereby the opening of the container wall is completely covered by the associated foil piece. The cut edge is covered in that one foil piece, or both foil pieces are formed from the surface of the container wall in through the opening. Both foil pieces are melted together in the area of the cut edge so that a single protective covering layer is made which, as a result of the melting, adheres to the cut edge. An opening is made in both pieces of foil, and the opening of each has a smaller cross section than that of the original opening of the container wall, which comprises a cut edge to be covered. The material separated from the two foil pieces during the setting in of the openings is fed off as waste.

In the known process, the tube-shaped area which covers the cut edge arises from processes of shaping, melting and the setting in of openings in both the foil pieces. The two plane areas of the protective covering layer bordering the tube-shaped area are formed by the portions of both pieces of foil which are applied to the surfaces of the container wall but not formed.

U.S. Pat. No. 4,116,359 describes the filling openings of tin cans being closed by a so-called pull tab which is made of an aluminum layer and a synthetic foil adhered to same. While the pull tab is partly pressed into the filling opening by a punch, the synthetic foil is pulled off to lay around the edge of the filling opening.

It is an object of the present invention to provide an edge protection in a container which is simple and cost-effective to produce.

This object has been achieved in a process according to the present invention by producing the protective covering layer from a single foil piece which is applied to the container wall comprising the opening and then formed, wherein at least one of the plane areas is formed and adhered to the container wall.

The object has also been achieved in a container according to the present invention by making the protective covering layer from one piece of material to cover only the area of the outer surface of the container wall which borders the opening.

The process and form of the protective covering layer according to the present invention lead to a significant simplification in relation to the production and the application of the protective covering layer in the cut edge. The foil materials are not melted in the area of the cut edge, nor are melted foil pieces adhered to same.

Single pieces of foil of various forms can be used for the protective covering layer which afford a low labor-consuming application to the opening. Depending on the shape of the foil supplied, a smaller or larger number of procedural steps for applying it to the cut edge must be carried out. The foil can be supplied already pre-formed to such a degree that only one of the plane areas must be produced by forming the foil and adhered to the container wall.

The plane areas of the protective covering layer are adhered to the inner and outer surfaces of the container wall after feeding and forming of the foil. The tube-shaped area of the protective covering layer which covers the cut edge does not need to be adhered thereto. It is, however, possible in certain embodiments of the invention to adhere the protective covering layer to the cut edge.

Whatever the form of the fed foil, either no foil material waste or very little waste is produced by the manufacture and application of the protective covering layer to the cut edge. In contrast to known processes, a significant saving in material is thus achieved.

The present invention can be applied usefully to all containers where it is to be avoided that a medium, in particular the liquid contents, leaks into the container wall. In the area of the opening, the surface of the container wall is often broken open, such as then when the opening is produced by cutting or punching. By applying the protective covering layer, the same or a similar protection can be made in the area of the edge as exists in the other areas of the container irrespective of the outer shape of the container. The foil is advantageously formed and/or adhered to the container wall with the aid of heat. Heat sealing is particularly suitable method in this regard.

An advantageous aspect of the present invention is the use of a foil for the production of the protective covering layer which is formed from a plane section and a tube-shaped section. It is thereby possible to feed the foil in this form to the container wall or to produce this form at the container wall after the foil has been fed thereto. The plane section is laid and adhered onto the inner surface or the outer surface of the container wall, whereby adhering can take place before or after the complete forming or simultaneously with the complete forming of the foil into the protective covering layer. The plane section of the foil laid and adhered onto the surface forms one of the two plane areas of the protective covering layer.

The tube-shaped section is guided into the opening of the container wall to cover the cut edge of the opening while a portion projects out of the opening. The part of the tube-shaped section of the foil lying inside the opening forms the tube-shaped area of the protective covering layer which covers the cut edge. As already mentioned, the tube-shaped section can be formed before or after the foil is fed by forming the foil at the container wall.

The portion of the tube-shaped section of the foil which projects out of the opening of the container wall is formed and adhered to the container wall surface which is opposite the plane section of the foil. The second plane area of the protective covering layer is thus formed.

In one advantageous embodiment of the present invention, the foil has a sheet-like form, from which the tube-shaped section is formed. It is advantageous when an opening is made in the sheet-like foil, whereby the border area is formed into the tube-shaped section.

The foil is advantageously laid against the inner surface of the container wall and adhered thereto such that the plane section of the foil forms a protective layer for at least one part of the container inner surface. In this embodiment, the protective layer normally provided for the container inner surface can also be used as a protective covering layer for the cut edge of the container opening.

In another advantageous embodiment, the foil is laid against the inner and outer surfaces of the container wall so that only the area of the inner surface and/or of the outer surface bordering on the cut edge of the container wall is covered.

In a still further advantageous embodiment, the foil fed to the container wall has a tube-shaped form guided into the opening so that a portion covering the cut edge, a portion rising over the outer surface above the opening and a portion rising over the inner surface above the opening are formed. After the pre-formed foil has been fed to the container wall, each of the portions rising above the opening are formed again and adhered against those container wall surfaces which are turned theretowards. The portions now formed again and adhered against the surfaces of the container wall form the plane areas of the protective covering layer. The tube-shaped area of the protective covering layer is formed from the rest of the tube-shaped foil which remains inside the opening.

In a container with an edge protection according to the present invention, a protective covering layer is applied at the cut edge of the container opening. The protective covering layer is made from one piece of material and only covers the area of the outer surface of the container wall bordering the opening.

In an advantageous development of the present invention, the protective covering layer covers only the area of the inner surface of the container wall bordering the opening. The protective covering layer then has a rivet-like form and can be manufactured with a very small amount of material.

Another advantageous aspect of the present invention is that the protective covering layer is formed to cover the inner surface of a container lid. It is advantageous when the protective covering layer which covers the lid simultaneously forms the protective layer of the inner lid surface. The protective layer usually necessary for a container to prevent the contents from leaking through to the container wall inner surface is then used at the same time as a protective covering layer for the cut edge of the container opening. The procedure can then be removal of the cardboard in the area of the opening, punching a hole in the protective layer and then placing the protective layer around the edge to be protected.

Advantageously, a pull tab is adhered to the container wall outer surface. The pull tab can be attached to the protective covering layer of the cut edge, for example after the container has been filled, so that the opening is closed in a leak-proof way.

The production of a container with a protective coating along an edge segment is described in our copending application Ser. No. 08/418,798, filed Apr. 7, 1995, now allowed. The disclosure therein is incorporated herein by reference.

BRIEF DESCRIPTION OF THE DRAWINGS

These and other objects, features and advantages of the present invention will become more readily apparent from the following detailed description thereof when taken in conjunction with the accompanying drawings wherein:

FIG. 2 is a cross-sectional view of the lid of the container from.FIG. 1 with an opening covered by a pull tab;

DETAILED DESCRIPTION OF THE DRAWINGS

Figure 1:
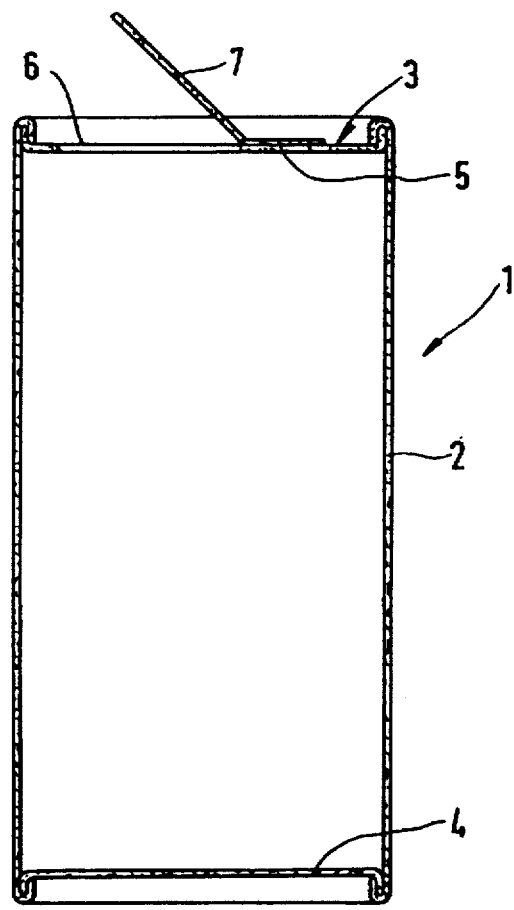
FIG. 1 is an elevational or longitudinal cross-sectional view of a cylindrical container with a bottom and a lid comprising an opening.

The container 1 shown in FIG. 1 is formed as a can consisting of a cylindrical container body 2, a round-shaped bottom 4 and a round-shaped lid 3. The lid 3 is provided with an opening 6, whose border is covered by a protective covering layer 14, 34, 44 (see FIGS. 4, 9, and 11) as explained more fully below. The opening 6 can be closed by a pull tab 7, which in FIG. 1, is shown in a position pulled away from the opening 6. The container wall 5 of the lid 3, the container wall of the bottom 4 and the container wall of the container body 2 are attached fixedly to each other and form together one container wall of the container 1.

Figure 2:
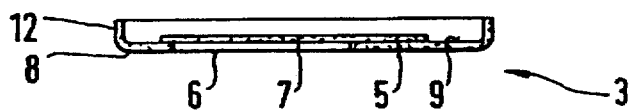
Figure 3:
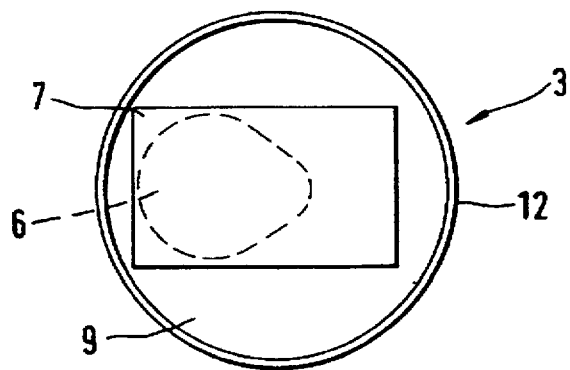
FIG. 3 is a top view onto the outer side of the lid of the container of FIG. 1.

As can be seen from FIGS. 2 and 3, the circumferential areas of the lid 3 and the bottom 4 are provided with a projecting rim 12. For manufacturing the container 1, the one front end of the container body 2 is flanged around the rim 12 of the lid 3, and the other front end is flanged around the rim 12 of the bottom 4 and is then attached fixedly to the lid 3 and the bottom 4 by, for example, heat sealing.

The filling of the container 1 takes place in a procedural step following the assembly of the container so that the circumferential edges of the lid 3 and the bottom 4 as well as the front edge of the container body 2 cannot come into contact with the contents. Filling takes places through the dispensing opening 6 which also serves as a filling opening.

Figure 13:
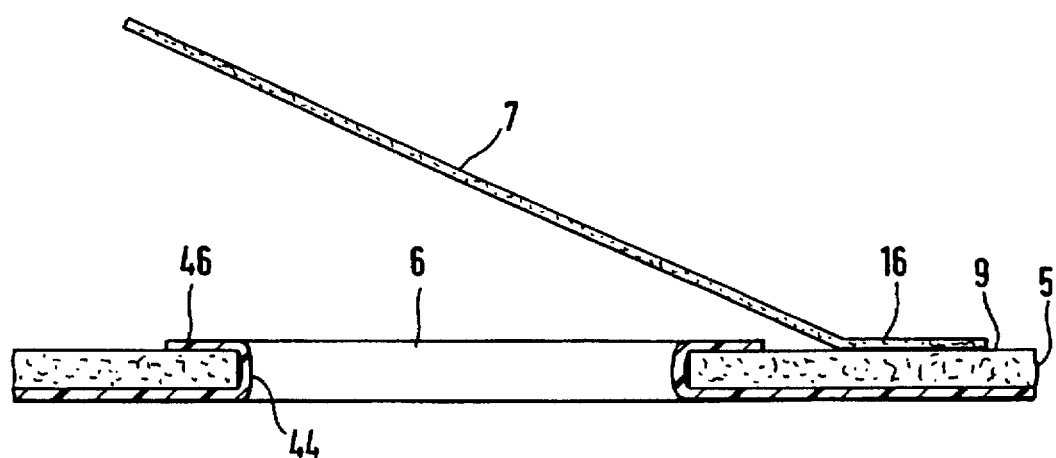
FIG. 13 is a cross-sectional view of an opening of a lid with a pull tab adhered to the wall of the lid in the open position.
Figure 14:
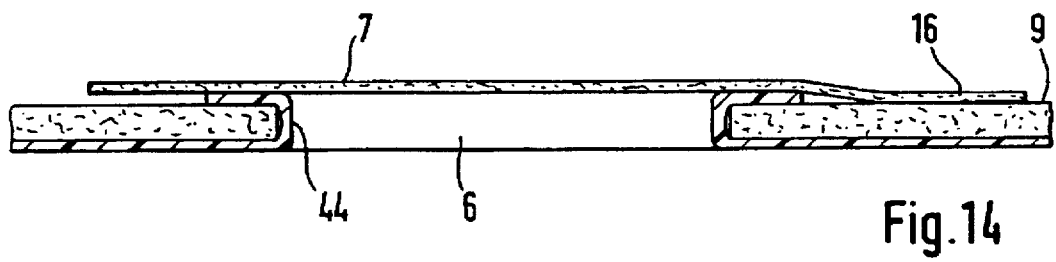
FIG. 14 is a cross-sectional view of an opening of a lid with a pull tab attached to the protective covering layer in the closed position.

The finished lid 3 is provided with the pull tab 7 in the area of the opening 6. The pull tab 7 is attached with one end 16 to the outer surface 9 of the lid 3 before filling where it takes up a position pulled away from the opening 6 as seen in FIG. 13. The fixing of the one end 16 of the pull tab 7 to the outer surface 9 of the lid 3 can take place, for example, by heat sealing. After the filling procedure, the opening 6 is closed in a leak-proof way by the pull tab 7 to take up the position shown in FIG. 14. The tab 7 can then be torn off from the lid 3 for discharging the contents of the container 1. Alternatively, the pull tab 7 of the finished lid 3 is already in the closed position, as shown in FIG. 14, before filling. The opening 6 serves thus only as a discharge opening.

Figure 5A:
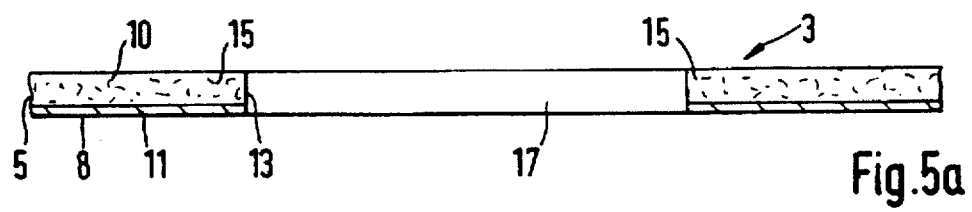
FIGS. 5a to 5e show the process steps of a first process for manufacturing the protective covering layer of FIG. 4.

As can be seen in particular from FIG. 5a, the container wall 5 is made up of a carrier layer 10 and a protective layer 11. The protective layer 11 covers the inner surface 8 of the entire container 1, that is the container body 2, the lid 3 and the bottom 4. The protective layer 11 serves to protect the contents from and to prevent same from leaking into the container wall 5. The protective layer 11 can be made up of a plurality of layers. For example, one layer of the composite protective layer 11 can be aluminum. The carrier layer 10 is made of paper or cardboard, and here too a multi-layered carrier layer 10 is also possible.

Before completion, the lid 3 is provided with an opening 17 (compare FIG. 5a), which goes through the container wall 5 and whose border forms an unprotected cut edge 13. This cut edge 13 is covered by an edge protection after completion of the lid 3. The opening 6 provided with the edge protection has at least approximately the same shape as the opening 17 of the uncompleted lid 3, but with a smaller cross section.

Figure 4:
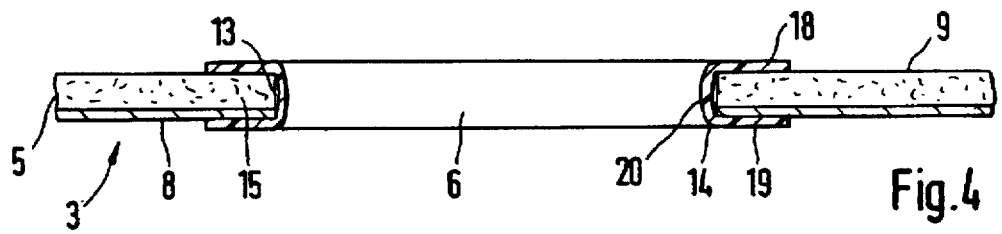
FIG. 4 is a cross-sectional enlarged view of an opening of a lid with a first embodiment of a protective covering layer.
Figure 9:
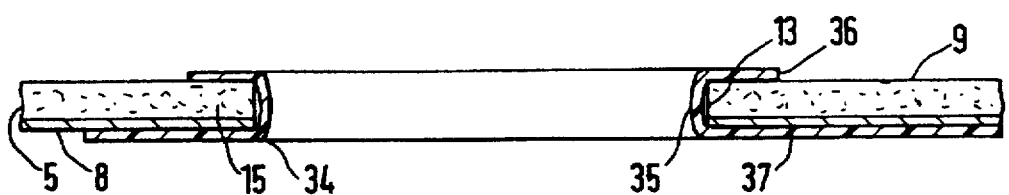
FIG. 9 is a cross-sectional enlarged view of the opening of a lid with a second embodiment of a protective covering layer.
Figure 11:
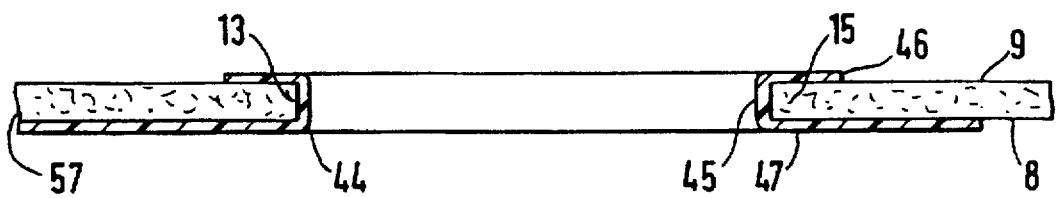
FIG. 11 is a cross-sectional enlarged view of an opening of a lid with a third embodiment of a protective covering layer.

The edge protection is formed in a first embodiment shown in FIG. 4 by a protective covering layer 14, in a second embodiment shown in FIG. 9 by a protective covering layer 34, and in a third embodiment shown in FIG. 11 by a protective covering layer 44. The protective covering layers 14, 34, 44 are sealable and have the same or similar features as the protective layer 11, so that the protection of the contents in the area of the opening 6 is ensured. The protective covering layers 14, 34, 44 are made from one single piece of material in all three embodiments mentioned above and hereinafter described.

In the first embodiment shown in FIG. 4 the protective covering layer 14 has the U-shape of a rivet. The middle area 20 of the rivet-shaped protective covering layer 14 is continuous in circumferential direction and covers the cut edge 13 of the opening 17 which is seen uncovered in FIG. 5a. A plane area 18 and a plane area 19 are joined to both ends to the middle area 20. The plane area 18 is adhered to the outer surface 9 and the plane area 19 is adhered to the inner surface 8 of the container wall 5. Only the area 15 of the container wall 5 directly bordering the cut edge 13 is covered by the plane areas 18, 19 of the protective covering layer 14. The middle tube-shaped area 20 of the protective covering layer 14 is not in contact with the cut edge 13 in the embodiment shown in FIG. 4. Alternatively, however, it is possible for the protective covering layer 14 to be in contact to the cut edge 13 or to adhere it to the cut edge 13, for example, by heat sealing without departing from the scope of the present invention.

Figure 7A:
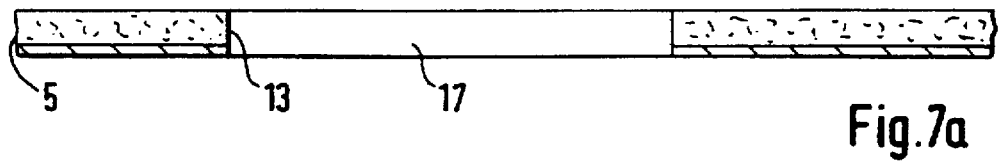
FIGS. 7a to 7c show the process steps of a third process for manufacturing the protective covering layer of FIG. 4.
Figure 7B:
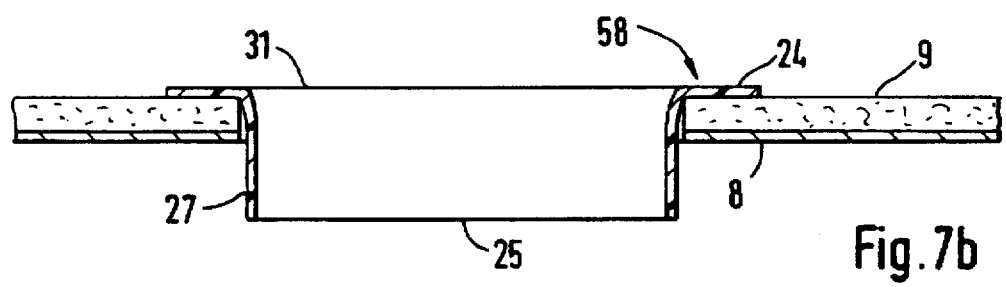
Figure 7C:
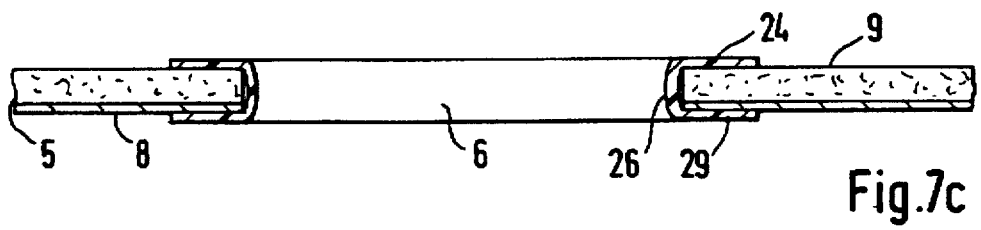
Figure 8A:
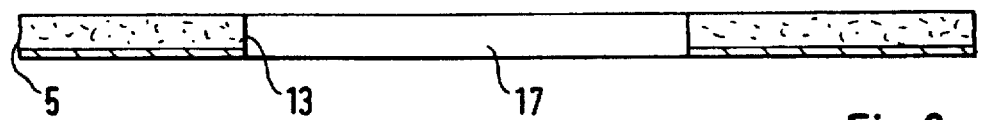
FIGS. 8a to 8c show the process steps of a fourth process for manufacturing the protective covering layer of FIG. 4.
Figure 8B:
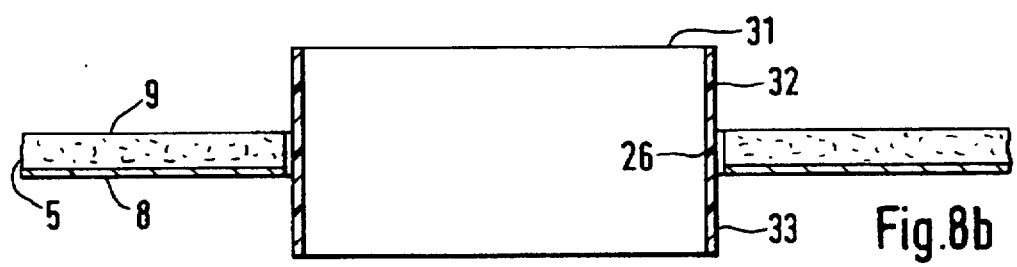
Figure 8C:
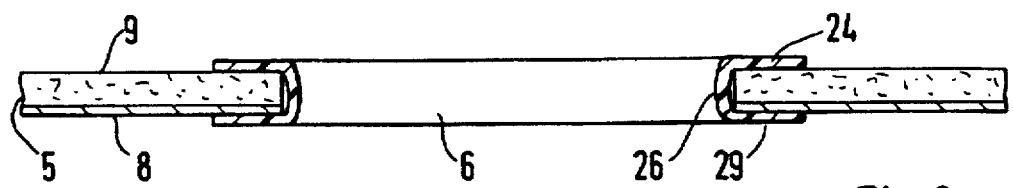

The protective covering layer 14 can be produced and applied to the opening 6 by using a variety of processes. A first process is shown in FIGS. 5a to 5e, a second process is shown in FIGS. 6a to 6d, a third process is shown in FIGS. 7a to 7c and a fourth process is shown in FIGS. 8a to 8c. The container wall 5 is fed a foil, which is differently formed in each process and which is formed into the protective covering layer 14 and adhered to the container wall 5 as shown in FIG. 4.

Figure 15:
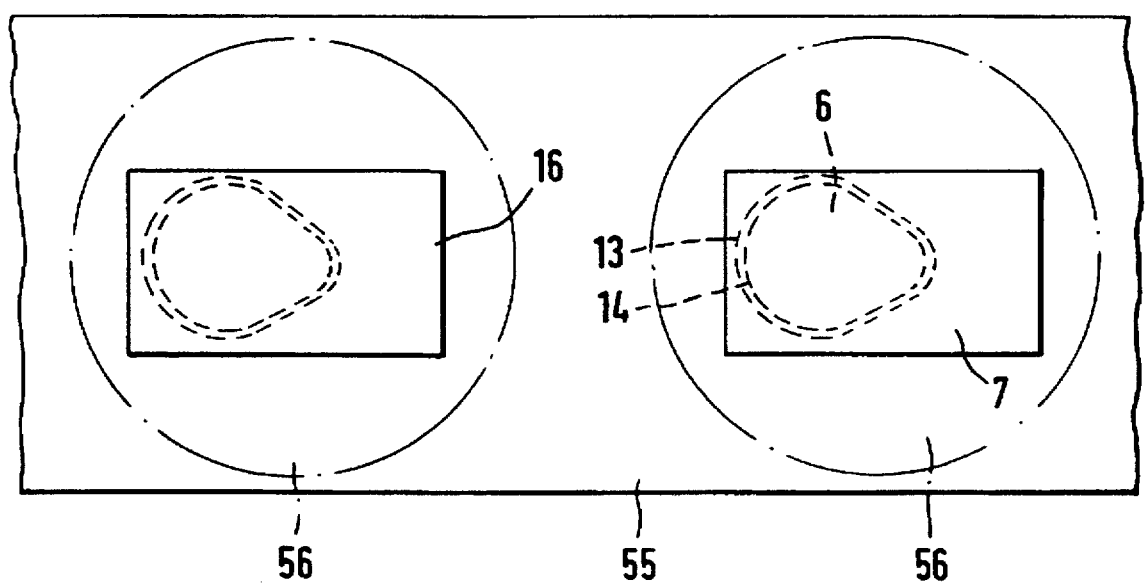
FIG. 15 is a plan view of a cardboard tape for the manufacture of a plurality of lids.

In the first process shown in FIGS. 5a to 5e, a container wall 5, which forms the completed lid 3 after being joined to the container 1, is presented. As already mentioned, the container wall 5 consists of a paper or cardboard carrier layer 10 and a protective layer 11 which forms the inner surface 8 of the container 1. The container wall 5 can, for example, be presented in the form of a cardboard tape 55, as seen in FIG. 15, which comprises segments 56 from which the lids 3 will be formed in a later procedural step. As mentioned above, the continuous opening 17 is made in the container wall 5. In the area of the cut edge 13 in the condition shown in FIG. 5a, the material of the carrier layer 10 is not covered by the protective layer 11, so that without a corresponding edge protection, the contents could leak into the carrier layer 10.

Figure 5B:
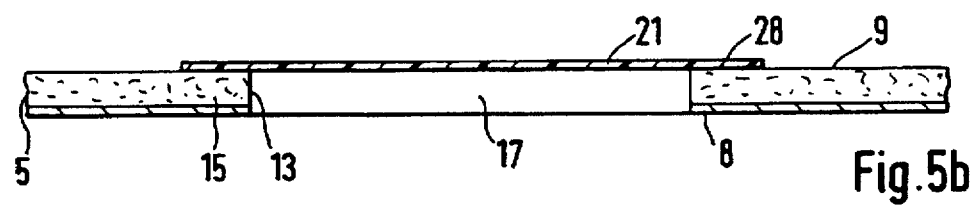

In the case of the procedural step shown in FIG. 5b, a sheet-shaped foil 21 is placed on the outer surface 9 of the container wall 5 so that it completely covers the opening 17, while a border section 28 rests on the area 15 of the container wall 5 which borders the cut edge 13. The sheet-like foil 21 is adhered to the container wall 5 by heat sealing of the border section 28.

Figure 5C:
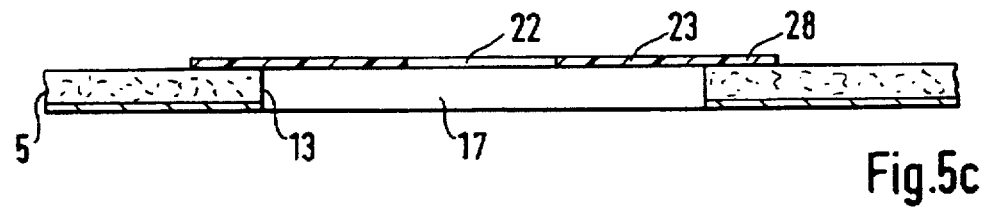

In a subsequent procedural step shown in FIG. 5c, an opening 22 is made in the foil 21, preferably by punching, so that a portion 23 extending beyond the cut edge 13 in the direction towards the center of the opening 17 is formed. The form of the opening 22 made in the foil 21 corresponds at least approximately to the form of the opening 17 of the container wall 5. The cross section of the opening 22 is, however, smaller than that of the opening 17.

Figure 5D:
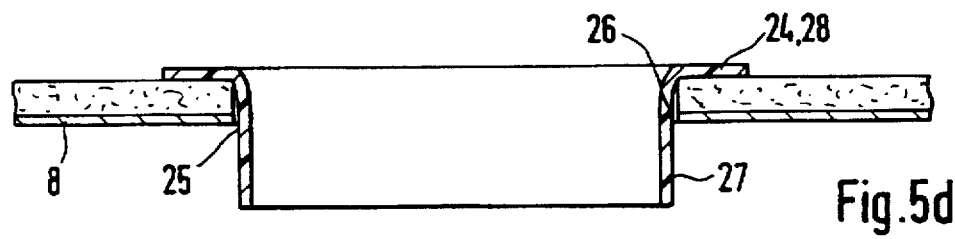

In a subsequent procedural step shown in FIG. 5d, the overlaying portion 23 is formed through the opening 17, preferably by the effect of heat, so that a plane section 24, which remains at the outer surface 9 of the container wall 5 and which corresponds to the border section 28 is formed; and a tube-shaped section 25 is thus also formed. The tube-shaped section 25 consists of a portion 26 which covers the cut edge 13 and a portion 27 which extends out through the opening 17.

Figure 5E:
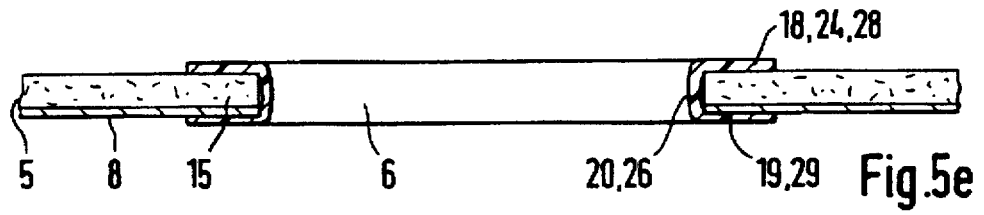

In a subsequent procedural step shown in FIG. 5e, the portion 27 which extends out is formed again in the direction towards the inner surface 8 of the container wall 5, so that a further plane portion 29 is formed in the foil 21. Before or during the forming again of the portion 27 which extends out, the foil 21 can in addition be stretched, so that the portion 26 which covers the cut edge 13 comes to lie adjacent to the cut edge 13. The plane section 29 of the foil 21 is then adhered to the inner surface 8 of the container wall 5, preferably by heat sealing. The foil 21 is now formed into the protective covering layer 14 and adhered to the container wall 5. The plane portion 24 of the foil 21 corresponds to the plane area 18 of the protective covering 14, the portion 26 which covers the cut edge 13 corresponds to the middle area 20 and the plane portion 29 corresponds to the plane area 19.

Figure 6A:
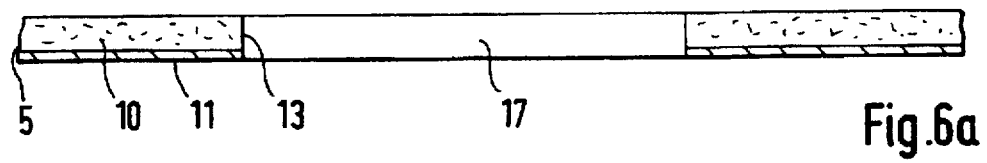
FIGS. 6a to 6d show the process steps of a second process for manufacturing the protective covering layer of FIG. 4.
Figure 6B:
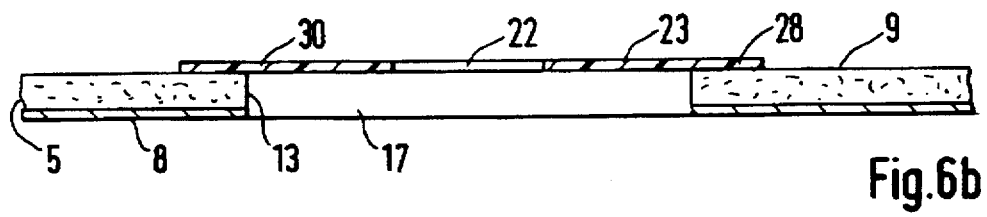
Figure 6C:
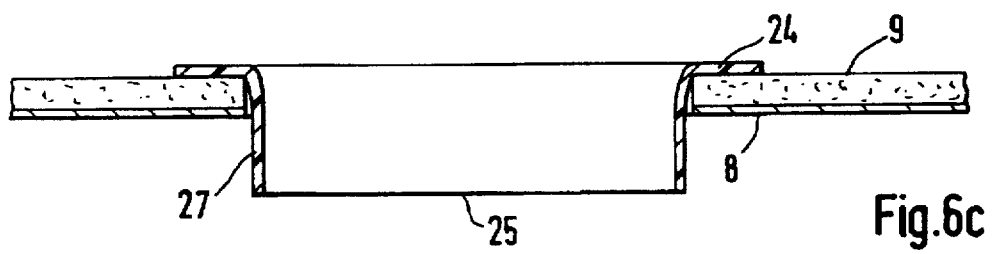
Figure 6D:
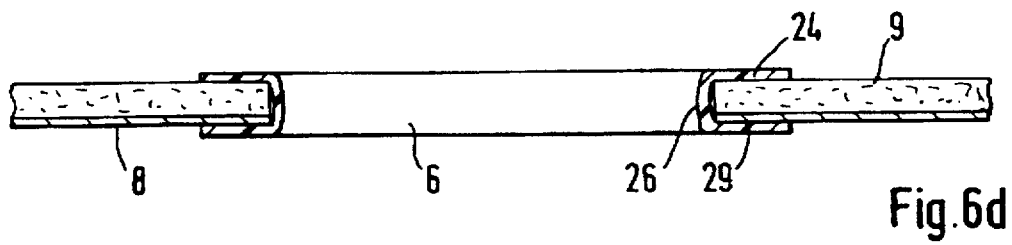

In the second process shown in FIGS. 6a to 6c, a container wall 5 is presented in FIG. 6a, which corresponds to the container wall 5 in FIG. 5a. In a first procedural step shown in FIG. 6b, a foil 30 is fed to the container wall 5. This foil 30 already has the form described in the first process and shown in FIG. 5c. The foil 30 has a sheet-like, flat form and is provided with an opening 22. The sheet-like foil 30 is placed onto the outer surface 9 of the container wall 5 and adhered to same, preferably by heat sealing, so that a border section 28 and a portion 23 extending beyond the cut edge 13 are formed. The following procedural steps as shown in FIGS. 6c and 6d are the same as in the first process described above and shown in FIGS. 5d and 5e. The portion 23 is formed through the opening 17, so that a tube-shaped section 25 is formed. The portion 27 which extends out through the opening 17 is formed again in the direction towards the inner surface 8 of the container wall 5 and adhered to same.

In the third process described in FIGS. 7a to 7c, a container wall 5 is also presented in FIG. 7a which corresponds to the container wall 5 of FIG. 5a. In a first procedural step as shown in FIG. 7b, a foil 58 is fed to a container wall 5. This foil 58 already has the form as shown in FIG. 5d. The foil 58 has a plane section 24 and a tube-shaped section 25, and is guided into the opening 17 in such a way that it is pierced by the tube-shaped section 25. The plane portion 24 of the foil 58 which comes to rest on the outer surface 9 is adhered to the container wall 5 preferably by heat sealing. In a subsequent procedural step shown in FIG. 7c, the portion 27 which extends out through the opening 17 is formed in the direction towards the inner surface 8 of the container wall 5 and is adhered there preferably by heat sealing in the same way as in the procedural step shown in FIG. 5e.

In the fourth process shown in FIGS. 8a to 8c, a tube-shaped foil 31 is fed to a container wall 5 in a first procedural step of FIG. 8a has the same wall form as those in FIGS. 5a, 6a and 7a. The tube-shaped foil 31 is guided into the opening 17 of the container wall 5 so that a portion 26 which covers the cut edge 13, a portion 32 which extends out through the opening 17 over the outer surface 9, and a portion 33 which extends out through the opening 17 over the inner surface 8 are formed. In a subsequent procedural step as shown in FIG. 8c, the portion 32 which extends out is formed in the direction towards the outer surface 9 and adhered there, preferably by heat sealing. The portion 33 which extends out is formed in the direction of the inner surface 8 and adhered there, also preferably by heat sealing.

The second embodiment of a protective covering layer 34 shown in FIG. 9 consists of a middle area 35 and two plane areas 36 and 37 which adjoin, one on each end, the middle area 35. The plane area 36 is adhered to the outer surface 9 of the container wall 5 and the plane area 37 adheres to the inner surface 8 of the container wall 5. The plane area 36 covers only the area 15 which directly borders the cut edge 13 and the plane area 37 extends over a larger area, preferably over the entire inner surface 8 of the lid 3.

Figure 10A:
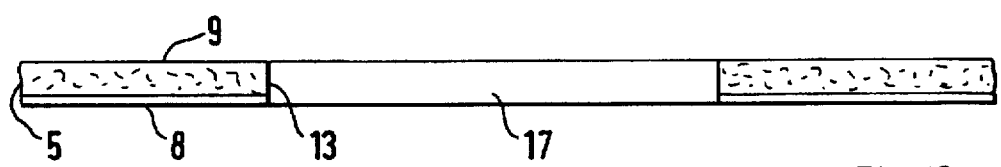
FIGS. 10a to 10c show the process steps for manufacturing the protective covering layer of FIG. 9.
Figure 10B:
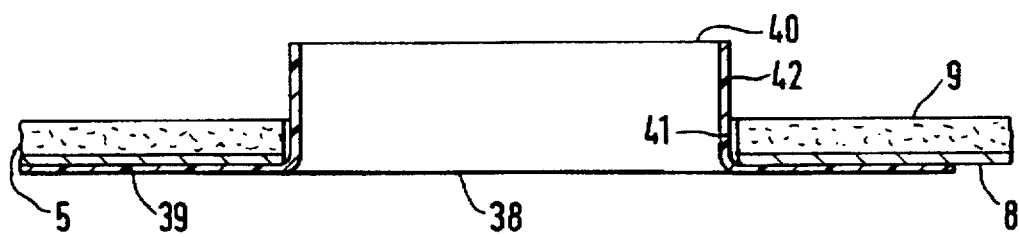
Figure 10C:
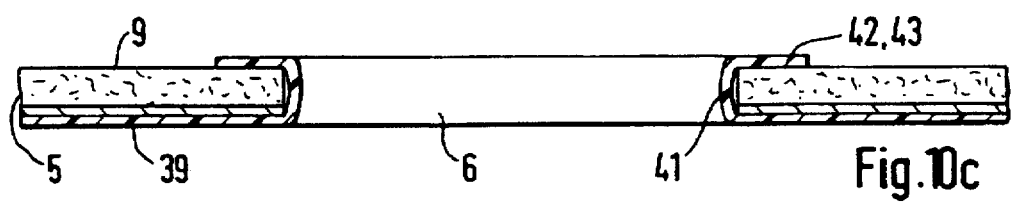

In the process shown in FIGS. 10a and 10c for the manufacture and application of the protective covering layer 34 shown in FIG. 9, a container wall 5 is presented in FIG. 10a which corresponds to the container wall 5 in FIGS. 5a, 6a, 7a and 8a.

In a first procedural step shown in FIG. 10b, a foil 38 is fed to the container wall 5. The foil 38 consists of a plane portion 39 and a tube-shaped section 40. The plane portion 39 is placed onto the inner surface 8 of the container wall 5 and adhered there. The tube-shaped section 40 is guided into the opening 17 in such a way, that a portion 41 which covers the cut edge 13 and a portion 42 which extends out through the opening 17 are formed. In a subsequent procedural step as shown in FIG. 10c, the portion 42 which extends out is formed in the direction towards the outer surface 9 of the container wall 5 and adhered there, preferably by heat sealing. The portion 42 which extends out is hereby formed into a plane portion 43.

A third embodiment of a protective covering layer 44 is shown in FIG. 11. The protective covering layer 44 consists of a middle area 45, a plane area 46 and a plane area 47. The middle area 45 covers the cut edge 13. The plane area 46 is adhered to the outer surface 9 of the container wall 57 and covers the area 15 which directly borders the cut edge 13. The plane area 47 adheres to the inner surface 8 of the container wall 57, directly on the inner surface 8 of the carrier layer 10, and forms at the same time the protective layer of the container wall 57, whereby this protective layer covers the entire inner surface of the lid 3. The process for manufacturing and applying the protective covering layer 44 as shown in FIG. 11 is shown in FIGS. 12a to 12f described immediately hereinbelow.

Figure 12A:
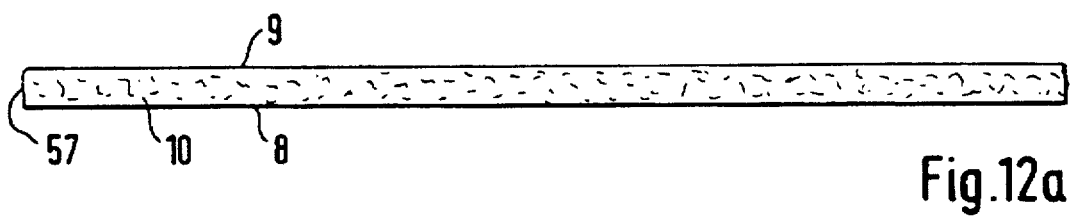
FIGS. 12a to 12f show a process for manufacturing the opening and the protective covering layer of the embodiment of FIG. 11.
Figure 12B:
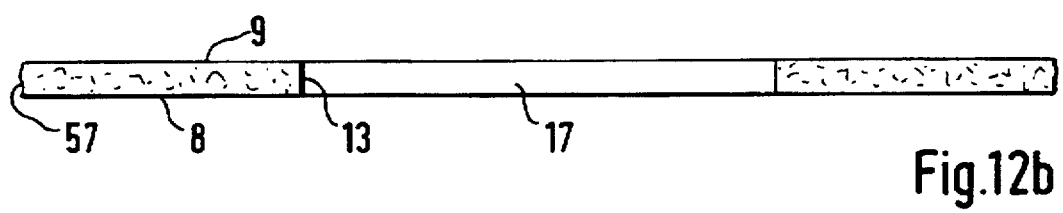

In this process a container wall 57 is presented, which is made only from a carrier layer 10 of paper or cardboard and which does not yet comprise an opening as seen in FIG. 12a. In a first procedural step shown in FIG. 12b, an opening 17 is made in the container wall 57, so that a cut edge 13 is formed.

Figure 12C:
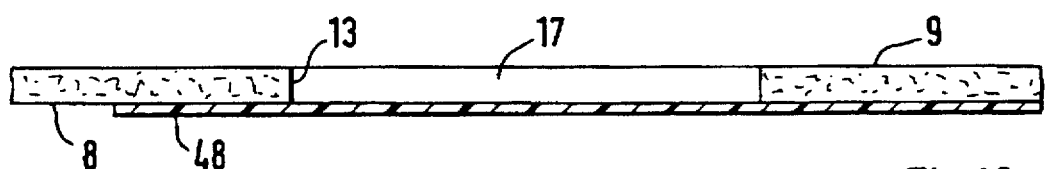
Figure 12D:
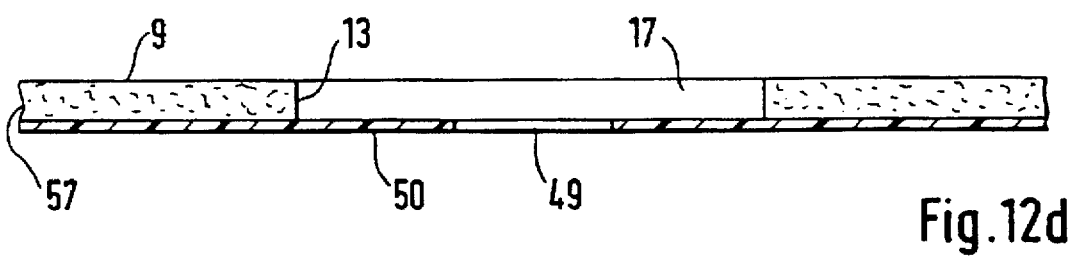

In a subsequent procedural step shown in FIG. 12c, a flat foil 48 is fed to the container wall 57 and adhered to the inner surface 8 of the container wall 57. The opening 17 of the container wall 57 is hereby completely covered the sheet-like foil 48. In a following procedural step shown in FIG. 12d, an opening 49 is made in the foil 48, preferably by punching, so that a portion 50 arises which extends beyond the cut edge 13.

Figure 12E:
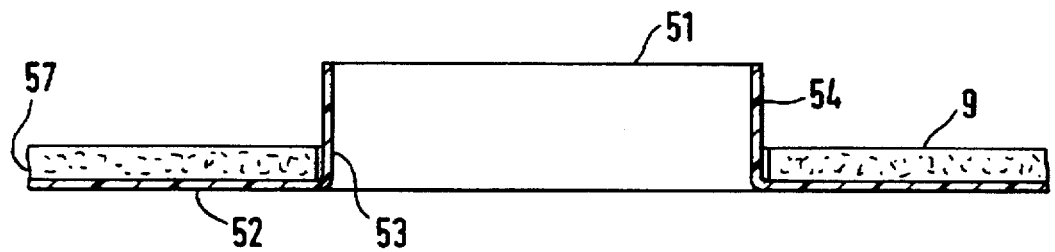

In a subsequent procedural step shown in FIG. 12e, the portion 50 of the foil 48 is formed through the opening 17 so that a tube-shaped section 51 is formed which extends through the opening 17. The part of the foil 48 which is not formed and lies on the inner surface 8 of the container wall 57 forms a plane portion 52 of the foil 48. The tube-shaped portion 51 consists of a portion 53 which covers the cut edge 13 and a portion 54 which extends out through the opening 17.

Figure 12F:
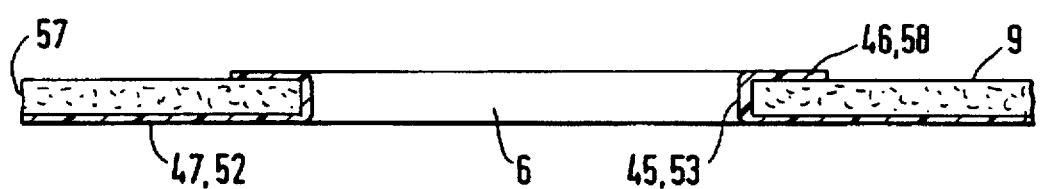

In a subsequent procedural step shown in FIG. 12f, the portion 54 which extends out is formed in the direction towards the outer surface 9 of the container wall 57 and adhered there, preferably by heat sealing. The described process as shown in FIGS. 12a to 12f could also be used in an appropriate way for manufacturing the protective covering layer 34 as shown in FIG. 9.

FIGS. 13 and 14 illustrate how the pull tab 7 can be closed so that the opening 6 is leakproof. The opening 6 has the protective covering layer 44 shown in the embodiment of FIG. 11. The leakproof closing of the opening 6 occurs by the pull tab 7 being placed over the opening 6 and adhered fixedly to the plane area 46 of the protective covering layer 44, preferably by heat sealing. Thermoplastic and/or heat-sealable foil material, for example polyethylene, is used for the protective covering layers 14, 34, 44 and, when required, also for the protective layer 11.

A portion of a cardboard tape 55 is shown sectionwise in FIG. 15 and is presented to a known machine (not shown) for manufacturing the containers 1. The cardboard tape 55 is subdivided into a plurality of segments 56 represented by a dot-dash line, which are punched out of the cardboard tape 55 on the above mentioned machine and formed into lids 3. Each segment 56 comprises an opening 6, which is provided with a protective covering layer 14, as well as a pull tab 7, which is adhered with one end 16 to the outer surface 9 of the segment 56.

With the cardboard tape 55, which is usually presented in the form of a roll, the area of the opening 6 including the edge protection and the closing element are formed to such a degree that the machine for manufacturing containers 1 requires less procedural steps and produces less waste. It is, of course, also possible as an alternative to the described embodiments to provide the carrier layer 10 on both sides with a protective layer 11 (not shown).

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Process for covering a cut edge of an opening of a wall of a container with a protective covering layer, the wall being provided with an inner layer on the planar inner surface thereof to provide protection of contents of the container and of the wall, comprising the steps of providing the protective covering layer in the form of a one-piece foil having physical characteristics similar or identical to the inner layer, selectively feeding the one-piece foil to the wall from above or below the opening whereby the foil has the capability of being applied from above or below the opening, and deforming the one-piece foil such that it has a tube-shape covering the cut edge of the opening, a first plane area adhered to an outer surface of the wall and present only in an immediate region adjoining the cut edge and a second plane area adhered to the inner layer, at least one of the plane areas being formed and adhered to the wall.

2. The process according to claim 1, wherein heat is used to perform either or both of the adhering of the first and second plane areas to the wall and the forming of the at least one of the plane areas to the wall.

3. The process according to claim 1, wherein the foil is adhered to at least one of the inner layer and the outer surface of the wall by heat sealing.

4. The process according to claim 1, wherein the step of deforming the foil includes forming the foil to comprise a plane portion and a tube-shaped section, whereby the plane portion is placed onto and adhered to one of the inner layer and the outer surface of the wall and the tube-shaped section is guided into the opening of the wall such that a portion is formed which extends beyond the opening, which portion is formed and adhered to a surface of the wall opposite the plane portion.

5. The process according to claim 4, wherein the plane portion forming the second plane area is adhered to the inner layer before the portion of the tube-shaped section forming the first plane area is adhered to the outer surface of the wall.

6. The process according to claim 4, wherein the plane portion forming the second plane area is adhered to the inner layer and the portion of the tube-shaped section forming the first plane area is adhered to the outer surface of the wall such that both are present only in an immediate region adjoining the cut edge.

7. The process according to claim 4, wherein the foil in the form of a sheet is placed on one of the inner layer and the outer surface of the wall such that the opening which constitutes the cut edge of the wall is covered, whereupon an opening is made in the foil sheet, which opening has a cross section smaller than that of the opening constituting the cut edge, so that a portion is formed in the foil sheet, which portion extends beyond the cut edge in a direction towards a center of the opening of the wall, whereupon the portion is formed into a tube-shaped section which is guided into the opening of the wall such that the tube-shaped section both covers the cut edge and extends beyond the opening of the wall, whereby the unformed part of the foil sheet remains as a plane portion lying on the inner layer or outer surface whereupon the part of the tube-shaped section extending beyond the opening of the wall is again formed and adhered to the surface of the wall opposite the plane portion.

8. The process according to claim 4, wherein the plane portion and the tube-shaped section are formed from a foil sheet.

9. The process according to claim 8, wherein the plane portion and the tube-shaped section are formed after the foil sheet has been fed to the wall.

10. The process according to claim 8, wherein an opening is made in the foil sheet, with a border area of the opening being formed into the tube-shaped section.

11. The process according to claim 10, wherein the opening is made after the foil sheet has been fed to the wall.

12. The process according to claim 11, wherein the opening is made such that a portion of the foil sheet is formed which extends beyond the edge of the opening of the wall in a direction towards a center thereof.

13. The process according to claim 1, wherein said foil in the form of a tube-shaped foil is fed to the wall and guided into the opening such that a portion covering the cut edge, a portion extending beyond the outer surface through the opening, and a portion extending beyond the inner layer through the opening are formed, whereupon the portions extending beyond the opening are formed again and adhered to the inner layer and outer surface of the wall, respectively.

14. The process according to claim 1, wherein a pull tab is adhered to the outer surface of the wall and is attached to the protective covering layer such that the opening can be leakproof-closed.

* * * * *